United States Patent [19]

Hawie

[11] Patent Number: 4,897,952
[45] Date of Patent: Feb. 6, 1990

[54] FISHING ROD HANGER

[75] Inventor: Robert L. Hawie, Stratford, Conn.

[73] Assignee: The Hawie Manufacturing Co., Bridgeport, Conn.

[21] Appl. No.: 149,554

[22] Filed: Jan. 28, 1988

[51] Int. Cl.⁴ ............................................. A01K 97/10
[52] U.S. Cl. .................................. 43/21.2; 211/60.1; 248/201
[58] Field of Search .................. 43/21.2; 248/201; 211/60.1, 64, 70.8, 86

[56] References Cited

U.S. PATENT DOCUMENTS

| | | | |
|---|---|---|---|
| 572,770 | 12/1896 | Putnam | 211/68 |
| 3,421,632 | 1/1969 | Wood | 211/70.8 |
| 3,507,398 | 4/1970 | Schaefer | 211/64 |
| 3,643,811 | 2/1972 | Howerton | 211/64 |
| 3,995,742 | 12/1976 | Austin | 248/201 |
| 4,006,825 | 2/1977 | Austin | 211/64 |
| 4,132,381 | 1/1979 | McClellan | 211/70.8 |
| 4,485,578 | 12/1984 | Novey | 43/21.2 |

Primary Examiner—M. Jordan
Attorney, Agent, or Firm—Kramer, Brufsky & Cifelli

[57] ABSTRACT

A fishing rod hanger is disclosed wherein a plurality of cooperating brackets support a fishing rod. Each of the brackets comprises a cylindrical channel surface adapted to receive a portion of the rod. The cylindrical channels include a channel passageway which is obstructed with a latch element whereby the rod is securely supported in the brackets.

15 Claims, 2 Drawing Sheets

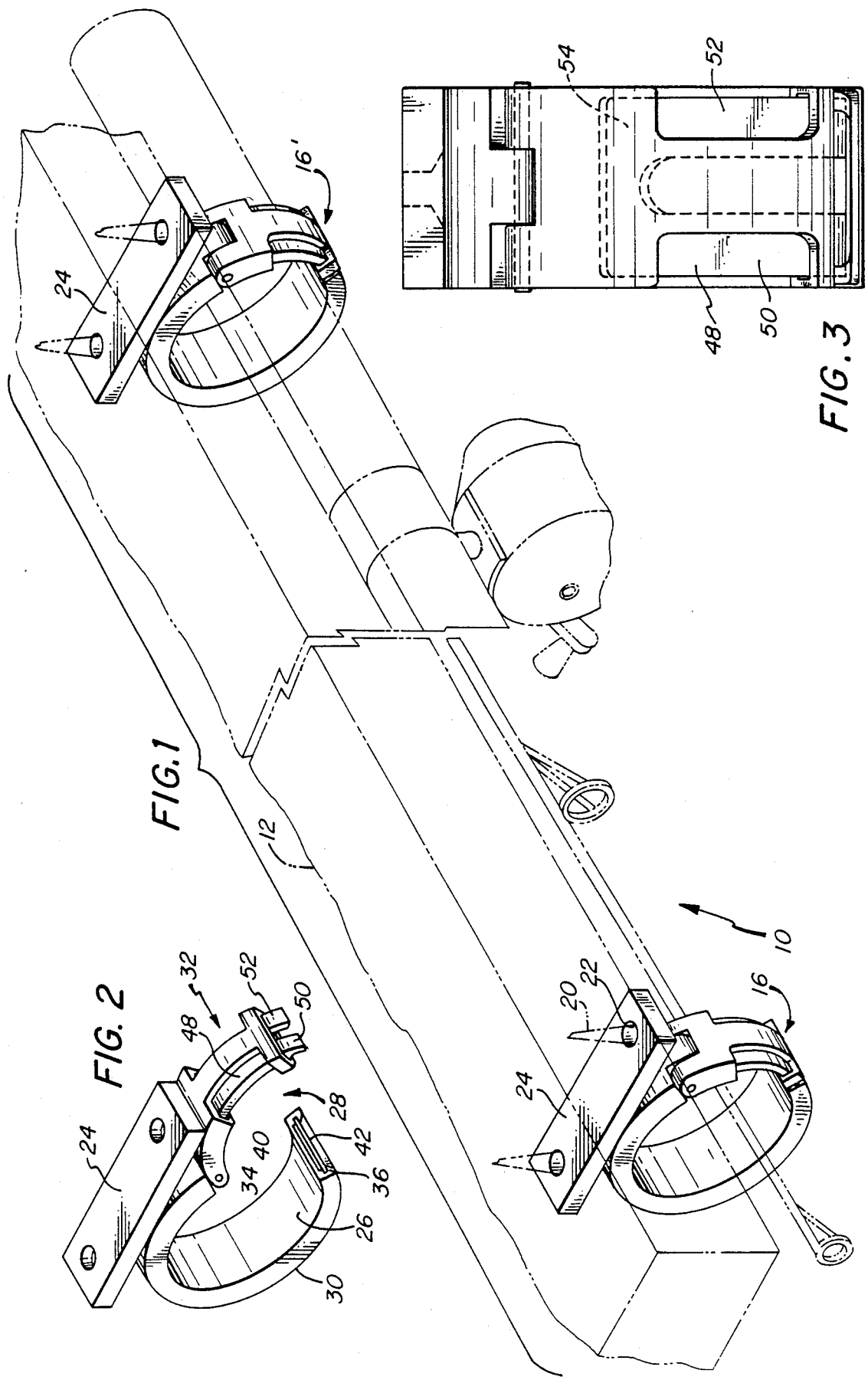

4,897,952

FISHING ROD HANGER

While the invention is subject to a wide range of applications, it is particularly suited for a fishing rod hanger structure and will be particularly described in that connection.

In particular, the present invention sets forth two cooperating bracket members for storing a fishing rod on a boat.

A wide variety of hanger structures are presently known to be useful for the storage of fishing rods on sea going vessels such as fishing boats and the like. Such structures often comprise elaborate racks employing locking mechanisms having a multitude of moving parts. Also, many of the known hanger structures, particularly those designed to provide overhead support, are unreliable and allow the rods or poles to dislodge and drop due to the motion of the boat.

In the prior art, fishing pole hangers were commonly designed so that the handle portion of the rod was received in a bracket having a one piece cylindrical opening while the other end support had a releasable opening to receive the tip of the rod. Examples of these supports are illustrated in U.S. Pat. Nos. 3,672,513; 4,006,825; and 4,109,796. The disadvantage of this arrangement is that when the fishing rod hanger brackets are located in a space which is only slightly larger than the length of the rod, the rod must be bent to place the handle in the stationary hanger.

In some cases, both rod hanger brackets can be opened. Examples of this arrangement are provided in U.S. Pat. Nos. 3,178,032; 4,106,811; 4,132,381 and 4,485,578. Although this arrangement, as illustrated in the latter patents, enables a rod to be stored in a confined space, the locking mechanisms themselves can be prone to open or difficult to operate. Also, it is advantageous to provide a cylindrical mount surface to support the rods so as to prevent damage to the rods from the motion of the boat.

It is an object of the present invention to provide a fishing rod hanger structure which enables a fishing rod to be placed into a confined location while securing the rod with a dependable and easily operated locking mechanism.

It is an advantage of the present invention to provide a fishing rod hanger which obviates the problems and disadvantages of the systems described hereinbefore.

It is a further advantage of the present invention to provide a fishing rod hanger which can be operated with one hand.

It is yet a further advantage of the present invention to provide a fishing rod hanger which has a cylindrically shaped channel for receiving either the handle or the tip portion of the rod.

It is a still further advantage of the present invention to provide a fishing rod hanger which is relatively inexpensive to manufacture.

Accordingly, there has been provided a fishing rod hanger comprising a plurality of cooperating brackets for attachment to either a horizontal or a vertical surface to support the fishing rod. Each of the bracket members comprises a cylindrical channel surface adapted to receive a portion of the rod. The cylindrical channel has a channel passage comprising a section of the outer peripheral surface of the bracket member. Latch structure is movably connected to the bracket member for obstructing the channel passage whereby the portion of the rod received in the bracket member is confined within the cylindrical channel.

The invention and further developments of the invention are now elucidated by means of preferred embodiments shown in the drawings.

DESCRIPTION OF THE DRAWINGS

FIG. 1 is a perspective view, partly in phantom, of an overhead installation of the fishing rod hanger of the present invention.

FIG. 2 is a perspective view of a fishing rod hanger bracket with the latch member in the open position.

FIG. 3 is a front view of the latch member, partly in phantom, containing the latch strip.

DETAILED DESCRIPTION OF THE PREFERRED EMBODIMENT

Figure 4:
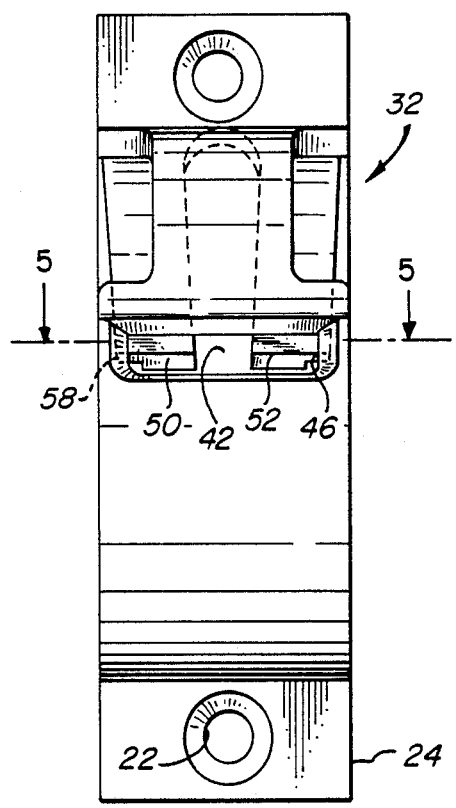
FIG. 4 is a front view of the hanger bracket in a closed position.

Referring initially to FIG. 1, the fishing rod hanger 10 of the present invention is illustrated as installed in an overhead position on a roof or ceiling 12. The ceiling 12 can be located in a boat, though limitation thereto is not intended. The fishing rod 14, shown in phantom, is suspended between two or more bracket members 16 and 16'. Components which are substantially the same are indicated by prime numerals. The bracket members 16 and 16' are adapted for securement to the ceiling 10 with conventional fastening means such as screws 20 or the like, through openings 22 provided in the planar base members 24.

The plurality of bracket members 16 and 16' are substantially identical and include a channel surface 26, as best seen in FIG. 2. The channel surface 26 is adapted to receive a portion of the rod 14. The channel 26 is preferably cylindrical in shape and has a channel passage 28 comprising a section extending from the outer peripheral surface 30 to the inner surface 26 of the bracket member 16. A latch structure 32 is connected to the bracket member for obstructing the channel passage 28 whereby the portion of the rod 14 received in the brackets 16 is confined within the cylindrical channel 26.

Figure 5:
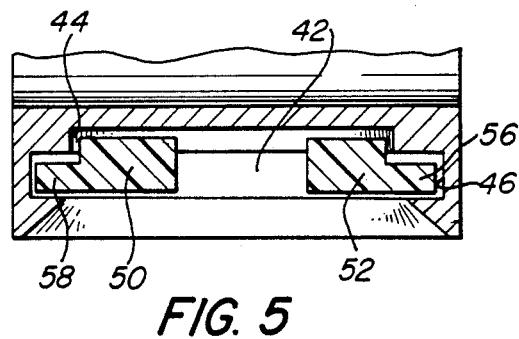
FIG. 5 is a view through 5—5 of FIG. 4.

The channel passage 28 is defined by first and second transverse edges 34 and 36 of the bracket member. Each of the transverse edges defines the portion of the bracket member extending from the outer peripheral surface 30 to the cylindrical channel surface 26. The latch member 32 is pivotably hinged at one end 40 to the first transverse edge 34. The latch member can be selectively locked to the second transverse edge 36. To enable the latch member to lock in place, the second transverse edge 36 includes an indentation 42, as best seen in FIGS. 2, 4 and 5. The inner peripheral surface 44 includes a slot 46 for locking an end of the latch device 32 in said indentation 42.

Referring to FIGS. 1 through 5, the latch member 32 comprises a latch strip 48 formed from two arm elements 50 and 52 integrally joined together at one end to a base element 54. The arm elements 50 and 52 have outer edges 56 and 58, respectively, being received in the slot 46 extending about the periphery of the indentation 42. When the latch strip is in place so that its outer edges are within the slot formed about the indentation, the latch structure 32 is locked in the indentation 42. The width of the latch strip is selected so that the outer edges 56 and 58 have an interference fit with the slot 46. The arm elements 50 and 52, after being pressed together, spring back to their original position so that the outer edges 56 and 58 snap into engagement with slot 46.

The fishing rod hanger of this invention is of simple design and can be manufactured in a wide variety of ways. Thus, conventional materials, such as, metals and woods may be employed and the individual brackets machined to final shape, by techniques such as turning on lathes, and the like or by rolling, casting and stamping. The support can also be prepared from a wide variety of organic polymeric materials including both thermoplastic and thermosetting resins. Representative of such materials are thermoplastic materials such as polyesters, including the acetates, acrylates and methacrylates, polyamides, polycarbonates and various suitable polyolefins, and thermosetting materials such as phenol-formaldehyde and urethane resins and the like. These materials may be molded by various suitable conventional techniques such as extrusion, casting, hot stamping of pre-formed stock and injection molding.

In a preferred embodiment, the latch strip is prepared from thermoplastic polymeric materials which are favorably processed by injection molding. The remainder of the hanger can be constructed of three separate components comprising the cylindrical channel 26, the planar base member 24 and the latch member 32. Assembly is accomplished by affixing the channel 26 by any conventional means to the planar base member 24. The latch is hinged by any desired means to one end of the channel member. The latch strip 48 is snapped within a slot formed in the latch member as best seen in FIGS. 2 and 3. The latch strip is preferably curved and can be inserted in the slot and frictionally held in place. The three components 24, 26, and 32 are preferably formed of a material such as stainless steel. However, it is within the terms of the present invention to construct the entire bracket of a plastic material, such as a thermoplastic polymer. Also, the latch member and the latch strip can be formed as one integral structure.

As previously stated, the hanger 10 is capable of installation in a variety of positions on both ceiling and wall structures. Referring to FIG. 1, an overhead installation is depicted. Since both of the brackets 16 and 16' include latches which open, both the handle and tip end of the rod can be inserted into the fishing rod hanger 10 at the same time. Then, both latches are snapped closed. Using two brackets that open enables the rod hanger 10 to be installed in a location which is only slightly longer than the length of the rod. The present invention is particularly advantageous in such a location since the rod does not have to be bent in order to place it within the rod support. Also, the cylindrical channel 26 is substantially circular and is thereby free of any jutting surface which could damage the handle or tip end of the rod if it were jolted about during movement of the boat.

Figure 6:
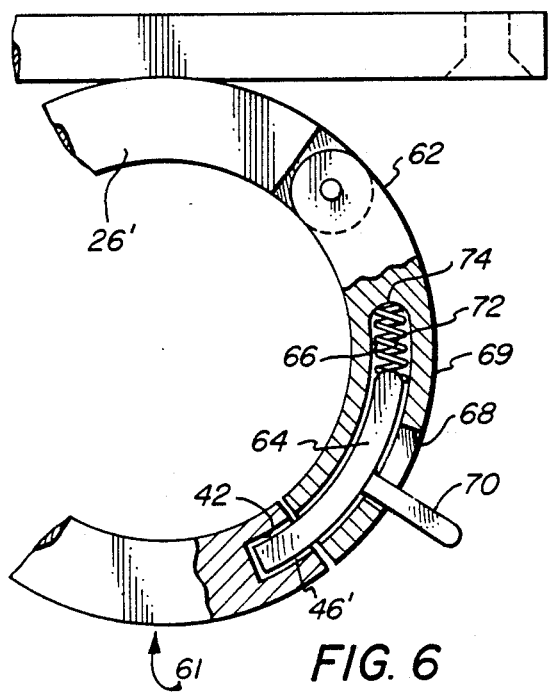
FIG. 6 is a fragmentary side view of a second embodiment of the present invention wherein the latch member is slidably received in an indentation formed in the bracket.
Figure 7:
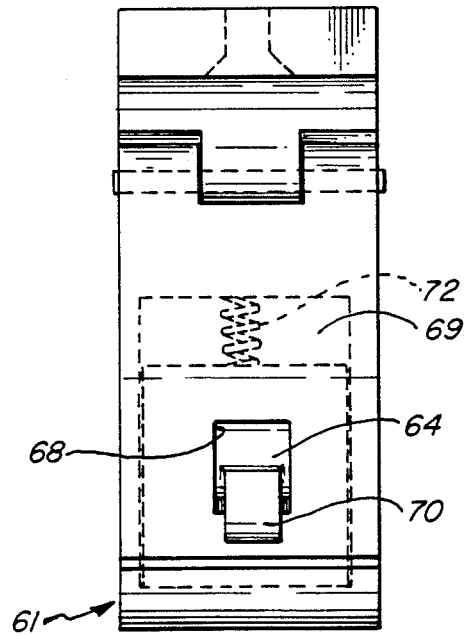
FIG. 7 is a front view of the embodiment illustrated in FIG. 6.

A second embodiment of the present invention sets forth another design for a latch member to be incorporated in a bracket member 61. The latch 60, as illustrated in FIGS. 6 and 7, is pivotably connected at one end 62 to the cylindrical channel 26'. The latch includes a latch strip 64 which is curved to be slidably received within a recess 66. The strip 64 can be biased into the indentation 42' to close the bracket member 61. The outer edges 68 and 70 of the slidable element 64 are received in the slot 46' formed in the indentation 42' to securely close bracket 61.

The latch 60 has a slot 68 extending through the outer surface 69. A pin-like element 70 projects through the slot 68 and is affixed to the latch strip 64. The pin 70 is used to slide the slidable element from an unlocked position wherein the slidable element 64 is not in contact with the indentation 42' to a locking position where the slidable element is locked in the slot 46'.

To secure the sliding latch strip 64 into a locking position within the slot 46', a spring 72 can be disposed between the end 74 of the recess 66 and the latch strip 64. The slidable element 64 is preferably formed of a plastic material as described with regards to the latch strip 48 described hereinbefore.

Although the channel of each bracket is preferably cylindrical, it is within the terms of the present invention to form the channel in any shape such as rectangular, oblong or triangular.

Although the hanger has been described as being suitable for holding a fishing rod, it is within the terms of the present invention to hand any desired article of commerce.

Although the hanger is described as comprising two bracket members, it is within the terms of the present invention to use any number of bracket members as desired.

The patents cited herein are incorporated by reference in their entireties.

It is apparent that there has been provided in accordance with this invention a fishing rod hanger which satisfies the objects, means and advantages set forth hereinbefore. While the invention has been described in combination with the embodiments thereof, it is evident that many alternatives, modifications and variations will be apparent to those skilled in the art of the foregoing description. Accordingly, it is intended to embrace all such alternatives, modifications and all variations as fall within the spirit and broad scope of the appended claims.

What is claimed is:

1. A fishing rod hanger comprising at least one cooperating bracket member adapted to support a fishing rod, said bracket member comprising:

a cylindrical channel surface adapted to receive a portion of the rod, said cylindrical channel surface being substantially circular in shape;

a channel passage formed in said channel surface comprising a section between the outer peripheral surface and the channel surface of said bracket member, said channel passage being defined by first and second transverse edges of said bracket member, each of said edges defining a portion of the bracket member extending from the outer peripheral surface to the cylindrical channel surface; and latch means moveably connected to said bracket member for obstructing said channel passage whereby the portion of the rod received in the bracket member is confined within the channel surface; said latch means being pivotably hinged at one end to said first transverse edge, said latch means being selectively locked at a second end to said second transverse edge; and said second transverse edge including an indentation extending from said outer peripheral surface, an inner peripheral surface of said indentation having a slot for receiving said second end of said latch means.

2. The fishing rod hanger of claim 1 wherein said latch means comprises a latch strip formed from two arm elements joined at one end to a base element, said arm elements having outer edges being received in the slot formed in said indentation for locking said latch means in said indentation.

3. The fishing rod hanger of claim 2 wherein the width of the arm elements is selected so that said outer edges have an interference fit with said indentation; and said arm elements after being pressed together, are spring biased apart whereby their outer edges snap into said slot.

4. The fishing rod hanger of claim 3 wherein said arm elements are constructed of a plastic.

5. The fishing rod hanger of claim 4 wherein said bracket member is constructed of a plastic.

6. The fishing rod hanger of claim 1 including a second cooperating bracket member for supporting a second portion of the rod, said second cooperating bracket member being spaced from said first bracket member.

7. The fishing rod hanger of claim 1 wherein said second transverse edge includes an indentation, an inner peripheral surface of said indentation forming a slot for receiving said second end of said latch means, said latch means comprises a slidable element adapted to be received in said indentation, the outer edges of said slidable element being received by the slot formed in said indentation for locking said latch means in said indentation.

8. The fishing rod hanger of claim 7 further including a notch extending partially through said latch means, means extending through said notch for sliding said slidable element from an unlocked position wherein said slidable element is not in contact with said indentation to a locking position wherein said slidable element is locked in said slot.

9. The fishing rod hanger of claim 8 wherein said latch means includes a chamber adapted to receive said slidable element.

10. The fishing rod hanger of claim 9 comprising spring means between said chamber and said slidable element to bias the slidable element into engagement with said slot.

11. The fishing rod hanger of claim 10 wherein said slidable element is constructed of a plastic.

12. The fishing rod hanger of claim 11 wherein said latch means is constructed of a plastic.

13. The fishing rod hanger of claim 12 wherein said bracket member is constructed of a plastic.

14. The fishing rod hanger of claim 6 wherein said second bracket member comprises:
a cylindrical channel surface adapted to receive the second portion of the rod;
a channel passage formed in said channel surface comprising a section between the outer peripheral surface and the channel surface of said second bracket member; and
latch means moveably connected to said second bracket member for obstructing said channel passage whereby the second portion of the rod received in the second bracket member is confined within the channel surface.

15. The fishing rod hanger of claim 14 wherein said channel passage is defined by first and second transverse edges of said bracket member, each of said edges defining a portion of the bracket member extending from the outer peripheral surface to the cylindrical channel surface.

* * * * *